US012719695B2

(12) United States Patent
Olea et al.

(10) Patent No.: US 12,719,695 B2
(45) Date of Patent: Aug. 25, 2026

(54) REAL-TIME ROBUST TAMPERING DETECTION OF PRODUCTS USING PIEZOELECTRIC CONTAINERS

(71) Applicant: VANDERBILT UNIVERSITY, Nashville, TN (US)

(72) Inventors: Carlos David Olea, Nashville, TN (US); Jules White, Nashville, TN (US); Michael Sandborn, Nashville, TN (US)

(73) Assignee: VANDERBILT UNIVERSITY

(*) Notice: Subject to any disclaimer, the term of this patent is extended or adjusted under 35 U.S.C. 154(b) by 604 days.

(21) Appl. No.: 17/820,298

(22) Filed: Aug. 17, 2022

(65) Prior Publication Data

US 2023/0053576 A1 Feb. 23, 2023

Related U.S. Application Data

(60) Provisional application No. 63/235,403, filed on Aug. 20, 2021.

(51) Int. Cl.

*H04L 9/32* (2006.01)
*H04L 9/00* (2022.01)

(52) U.S. Cl.

CPC ............ *H04L 9/3247* (2013.01); *H04L 9/006* (2013.01)

(58) Field of Classification Search

None

See application file for complete search history.

(56) References Cited

U.S. PATENT DOCUMENTS

| | | | |
|---|---|---|---|
| 7,218,215 | B2 | 5/2007 | Salsbury et al. |
| 8,279,067 | B2 | 10/2012 | Berger et al. |
| 9,386,553 | B2 | 7/2016 | Berger et al. |
| 10,097,353 | B1 | 10/2018 | Carlson |

(Continued)

FOREIGN PATENT DOCUMENTS

| | | | |
|---|---|---|---|
| EP | 2506228 | 10/2012 | |
| EP | 2506229 | 10/2012 | |
| WO | WO-2006026401 A2 * | 3/2006 | ............... G07C 3/00 |

OTHER PUBLICATIONS

Yee Yan Lim et al, Structural identification and damage diagnosis using self-sensing piezo-impedance transducers, 2006 987-995 (Year: 2006).*

(Continued)

*Primary Examiner* — Jeffrey C Pwu
*Assistant Examiner* — Mayasa A. Shaawat
(74) *Attorney, Agent, or Firm* — Meunier Carlin & Curfman LLC

(57) ABSTRACT

A piezoelectric container for tamper detection and damage monitoring of products within supply chains is described. The piezoelectric container enables tamper monitoring for a variety of items in transit including but not limited to those in the following sectors: medical, pharmaceutical, industrial, automotive, textiles, electronics, gems, precious metals, semiconductor chips, high value items, art, antiquities, safety critical components. For example, a sealed blister pack of prescription medicine may be stored and shipped in a piezoelectric container. The piezoelectric container can indicate tampering such as punctures, partial or total replacement of container contents, partial removal of contents, or other adverse or unwanted changes to the contents during transport.

28 Claims, 5 Drawing Sheets

100

(56) References Cited

U.S. PATENT DOCUMENTS

| | | | | |
|---|---|---|---|---|
| 2010/0195446 | A1* | 8/2010 | Michaels | G08B 13/08 367/135 |
| 2016/0041024 | A1* | 2/2016 | Reimer | G01F 23/2962 73/290 V |
| 2017/0052148 | A1* | 2/2017 | Estevez | G01N 29/075 |
| 2019/0372775 | A1* | 12/2019 | Camenisch | H04L 9/3247 |
| 2020/0391247 | A1* | 12/2020 | Jin | G01V 1/52 |

OTHER PUBLICATIONS

Applying piezoelectric film in electronic designs Posted on Nov. 2, 2009 by Electronic Products https://www.electronicproducts.com/applying-piezoelectric-film-in-electronic-designs/#.
J. Lee, B. Bagheri, and H.-A. Kao, "A cyber-physical systems architecture for industry 4.0-based manufacturing systems," Manufacturing letters, vol. 3, pp. 18-23, 2015.
C. S. Tang, J. D. Zimmerman, and J. I. Nelson, "Managing new product development and supply chain risks: The boeing 787 case," in Supply Chain Forum: An International Journal, vol. 10, No. 2. Taylor & Francis, 2009, pp. 74-86.
"The economic value of counterfeit and pirated products is projected to cost between $1.9 Trillion and $2.81 Trillion in 2022." https://iccwbo.org/content/uploads/sites/3/2017/02/ICC-BASCAP-Frontier-report-2016.pdf.
F. Murray, "Gtop counterfeiting risks manufacturers face in 2016," https://www.manufacturingindustryadvisor.com/topcounterfeitingrisks-manufacturers-face-in-2016.
A. I. A. of America, "A special report, counterfeit parts:increasing awareness and developing countermeasures," http://www.aiaaerospace.org/wp-content/uploads/2016/05/counterfeit-web11.pdf.
D. Kliewe, A. Kuhn, R. Dumitrescu, and J. Gausemeier, "Challenges in anti-counterfeiting of cyber-physical systems," Int. J. Soc. Behav. Educ. Econ. Manag. Eng, vol. 9, pp. 1732-1739, 2015.
A. Cardenas, S. Amin, B. Sinopoli, A. Giani, A. Perrig, S. Sastry et al., "Challenges for securing cyber physical systems," in Workshop on future directions in cyber-physical systems security, vol. 5, No. 1, 2009.
J.-P. Andreu and A. Rinnhofer, "Modeling of internal defects in logs for value optimization based on industrial ct scanning," in Fifth International Conference on Image Processing and Scanning of Wood. Bad Waltersdorf Austria, 2003, pp. 23-26.
C. Helfmeier, C. Boit, D. Nedospasov, and J.-P. Seifert, "Cloning physically unclonable functions," in 2013 IEEE International Symposium on Hardware-Oriented Security and Trust (HOST). IEEE, 2013, pp. 1-6.
R. Maes and I. Verbauwhede, "Physically unclonable functions: A study on the state of the art and future research directions," in Towards Hardware-Intrinsic Security. Springer, 2010, pp. 3-37.
G. E. Suh and S. Devadas, "Physical unclonable functions for device authentication and secret key generation," in 2007 44th ACM/IEEE Design Automation Conference. IEEE, 2007, pp. 9-14.
M. I. Albakri, L. D. Sturm, C. B. Williams, and P. A. Tarazaga, "Impedance-based non-destructive evaluation of additively manufactured parts," Rapid Prototyping Journal, vol. 23, No. 3, pp. 589-601, 2017.
L. Sturm, M. Albakri, C. B. Williams, and P. Tarazaga, "In-situ detection of build defects in additive manufacturing via impedancebased monitoring," in Proceedings of the 27th International Solid Freeform Fabrication Symposium, 2016, pp. 1458-1478.
C. Farrar, G. Park, H. Sohn, and D. J. Inman, "Overview of piezoelectric impedance-based health monitoring and path forward," Shock and Vibration Digest, vol. 35, No. 6, pp. 451-463, 2003.
C. Liang, F. Sun, and C. Rogers, "Coupled electro-mechanical analysis of adaptive material systems—determination of the actuator power consumption and system energy transfer," Journal of intelligent material systems and structures, vol. 8, No. 4, pp. 335-343, 1997.
V. G. Annamdas and M. A. Radhika, "Electromechanical impedance of piezoelectric transducers for monitoring metallic and non-metallic structures: A review of wired, wireless and energy-harvesting methods," Journal of Intelligent Material Systems and Structures, vol. 24, No. 9, pp. 1021-1042, 2013.
S. G. Taylor, K. Farinholt, M. Choi, H. Jeong, J. Jang, G. Park, J.-R. Lee, and M. D. Todd, "Incipient crack detection in a composite wind turbine rotor blade," Journal of Intelligent Material Systems and Structures, vol. 25, No. 5, pp. 613-620, 2014.
V. G. M. Annamdas and C. K. Soh, "Application of electromechanical impedance technique for engineering structures: review and future issues," Journal of Intelligent material systems and structures, vol. 21, No. 1, pp. 41-59, 2010.
L. J. Wells, J. A. Camelio, C. B. Williams, and J. White, "Cyberphysical security challenges in manufacturing systems," Manufacturing Letters, vol. 2, No. 2, pp. 74-77, 2014.
H. Turner, J. White, J. A. Camelio, C. Williams, B. Amos, and R. Parker, "Bad parts: Are our manufacturing systems at risk of silent cyberattacks?" IEEE Security & Privacy, vol. 13, No. 3, pp. 40-47, 2015.
L. Sturm, C. Williams, J. Camelio, J. White, and R. Parker, "Cyberphysical vunerabilities in additive manufacturing systems," Context, vol. 7, No. 2014, p. 8, 2014.
S. M. Strutner and C. Tenney, "Inexpensive verification via electromechanical impedance for additively manufactured parts," in SAMPE Conference, 2018.
L. D. Sturm, C. B. Williams, J. A. Camelio, J. White, and R. Parker, "Cyber-physical vulnerabilities in additive manufacturing systems: A case study attack on the. stl file with human subjects," Journal of Manufacturing Systems, vol. 44, pp. 154-164, 2017.
Y. Pan, J. White, D. C. Schmidt, A. Elhabashy, L. Sturm, J. Camelio, and C. Williams, "Taxonomies for reasoning about cyber-physical attacks in iot-based manufacturing systems." International Journal of Interactive Multimedia & Artificial Intelligence, vol. 4, No. 3, 2017.
S. Briais and U. Nestmann, "A formal semantics for protocol narrations," in International Symposium on Trustworthy Global Computing. Springer, 2005, pp. 163-181.
Y. Dodis, L. Reyzin, and A. Smith, "Fuzzy extractors: How to generate strong keys from biometrics and other noisy data," in International conference on the theory and applications of cryptographic techniques. Springer, 2004, pp. 523-540.
X. Boyen, "Reusable cryptographic fuzzy extractors," in Proceedings of the 11th ACM conference on Computer and communications security. ACM, 2004, pp. 82-91.
I. Buhan, J. Doumen, P. Hartel, and R. Veldhuis, "Fuzzy extractors for continuous distributions," in Proceedings of the 2nd ACM symposium on Information, computer and communications security. ACM, 2007, pp. 353-355.
P. M. Harris and R. V. Clarke, "Car chopping, parts marking and the motor vehicle theft law enforcement act of 1984," Sociology and Social Research, vol. 75, No. 3, pp. 107-116, 1991.
B. Stern, "Warning! bogus parts have turned up in commercial jets. where's the faa," Business Week, vol. 90, 1996. https://www.bloomberg.com/news/articles/1996-06-09/warning.
A. Weimerskirch, C. Paar, and M. Wolf, "Cryptographic component identification: Enabler for secure vehicles," in IEEE Vehicular Technology Conference, vol. 62, No. 2. IEEE; 1999, 2005, p. 1227.
A. Weimerskirch, K. Hoper, C. Paar, and M. Wolf, "Component identification: Enabler for secure networks of complex systems," Proceedings of Applied Cryptography an Network Security 2005 (ACNS 2005), 2005.
F. Chen, Y. Luo, N. G. Tsoutsos, M. Maniatakos, K. Shahin, and N. Gupta, "Embedding tracking codes in additive manufactured parts for product authentication," Advanced Engineering Materials, p. 1800495, 2018.
"Global impacts of counterfeiting and piracy to reach $4.2 trillion by 2022," Feb. 2017.
M. Sandborn, C. Olea, J. White, C. Williams, P. A. Tarazaga, L. Sturm, M. Albakri, and C. Tenney, "Towards secure cyber-physical information association for parts," Journal of Manufacturing Systems, vol. 59, pp. 27-41, 2021.

(56) References Cited

OTHER PUBLICATIONS

S. R. Chhetri, J. Wan, and M. A. Al Faruque, "Cross-domain security of cyber-physical systems," in 2017 22nd Asia and South Pacific Design Automation Conference (ASP-DAC), pp. 200-205, 2017.
M. Eckhart, A. Ekelhart, and E. Weippl, "Enhancing cyber situational awareness for cyber-physical systems through digital twins," in 2019 24th IEEE International Conference on Emerging Technologies and Factory Automation (ETFA), pp. 1222-1225, 2019.
S. Nakamoto, "Bitcoin: a peer-to-peer electronic cash system," 2008.
X. Xu, F. Rahman, B. Shakya, A. Vassilev, D. Forte, and M. Tehranipoor, "Electronics supply chain integrity enabled by blockchain," ACM Trans. Des. Autom. Electron. Syst., vol. 24, May 2019.
M. Westerkamp, F. Victor, and A. Kupper, "Tracing manufacturing processes using blockchain-based token compositions," Digital Communications and Networks, vol. 6, No. 2, pp. 167-176, 2020.
L. Aniello, B. Halak, P. Chai, R. Dhall, M. Mihalea, and A. Wilczynski, "Towards a supply chain management system for counterfeit mitigation using blockchain and puf," 2019.
A. E. Elhabashy, R. Dastoorian, L. J. Wells, and J. A. Camelio, "Random sampling strategies for multivariate statistical process control to detect cyber-physical manufacturing attacks," Quality Engineering, vol. 0, No. 0, pp. 1-18, 2020.
R. Kumar and R. Tripathi, "Traceability of counterfeit medicine supply chain through blockchain," in 2019 11th International Conference on Communication Systems Networks (COMSNETS), pp. 568-570, 2019.
Y. Dodis, L. Reyzin, and A. Smith, "Fuzzy extractors: How to generate strong keys from biometrics and other noisy data," in International conference on the theory and applications of cryptographic techniques, pp. 523-540, Springer, 2004.
X. Boyen, "Reusable cryptographic fuzzy extractors," (New York, NY, USA), Association for Computing Machinery, 2004.
Y. Wen and S. Liu, "Robustly reusable fuzzy extractor from standard assumptions." Cryptology ePrint Archive, Report 2018/818, 2018. https://eprint.iacr.org/2018/818.
K. Sato, K. Yasunaga, and T. Fujiwara, "A construction of robustly reusable fuzzy extractors over blockchains," pp. 353-357, 2020.
W. S. Na and J. Baek, "A review of the piezoelectric electromechanical impedance based structural health monitoring technique for engineering structures," 2018.
W. Qian, W. Yang, Y. Zhang, C. R. Bowen, and Y. Yang, "Piezoelectric materials for controlling electro-chemical processes," Nano-Micro Letters, vol. 12, p. 149, Dec. 2020.

* cited by examiner

100

300

400

REAL-TIME ROBUST TAMPERING DETECTION OF PRODUCTS USING PIEZOELECTRIC CONTAINERS

CROSS-REFERENCE TO RELATED APPLICATION

This application claims priority to U.S. Provisional Patent Application No. 63/235,403, filed Aug. 20, 2021, entitled "REAL-TIME ROBUST TAMPERING DETECTION OF PRODUCTS USING PIEZOELECTRIC CONTAINERS," which is incorporated herein by referenced in its entirety.

STATEMENT OF GOVERNMENT SUPPORT

This invention was made with government support under 1931931 awarded by the National Science Foundation. The government has certain rights in the invention.

BACKGROUND

Counterfeiting is a significant problem for safety-critical systems, because cyber-information, such as a quality control certification, may be passed off with a flawed counterfeit part. Safety-critical systems, such as airplanes, are at risk because cyber-information cannot be provably tied to a specific physical part instance.

More particularly, safety-critical cyber-physical systems (CPSs), such as automobiles, airplanes, and heavy equipment rely on complex distributed supply chains that source parts from manufacturers across the world. A fundamental problem that these systems must contend with is ensuring the integrity of both the cyber-components and physical parts that they receive through their supply chain. Because of the separation between the manufacturer and the consumer of the part, there are immense challenges in ensuring that physical parts arrive from the desired source and are not modified or swapped for inferior copies in transit.

Counterfeiting is a major concern to the aerospace and automotive supply chains as it poses not only risk of intellectual property (IP) theft (e.g., unlicensed copies of parts entering the black market) but also risk of system failure and loss of life due to the accidental use of poor quality fake parts.

Cyber-physical systems are designed and built based on models that relate the properties and dynamics of the physical parts in the system (e.g., jet engine turbines) with the cyber-components (e.g., engine control algorithms). If either the cyber-components (e.g., software) or the physical parts being incorporated into these systems have been tampered with, significant cyber-physical security risk is introduced.

While there are existing cyber-security techniques, such as roots of trust and signing chains, to help ensure software integrity, there is a lack of roots of trust and signing chains that can guarantee the source of the physical parts and the information associated with them. There are a number of threats that a CPS built from a distributed supply chain must contend with in order to maintain the integrity of the system including counterfeiting (e.g., malicious facilities can produce illegitimate copies of parts that appear correct at a surface level, but exhibit different performance characteristics), IP theft (e.g., both physical parts and their digital twins can be intercepted in the supply chain and digital thread, respectively, for unlicensed reproduction), part tampering (e.g., parts can be modified en route to their destination), and false certification (e.g., parts can be sold with fake attestations regarding the legality, testing, or other aspects of the part).

A severe risk is that it is difficult to provably link cyber-information, such as a CT-scan for quality control of a part, to the specific physical part instance for which it was created. For example, a manufacturer can send a 3D printed fuel injector for a jet engine to be CT-scanned for integrity and a digital certification of the part can be created to be sent to the purchaser of the part. An attacker, who has the CT-scan/certification data, can simply produce a counterfeit part, clone any physical identifiers (e.g., serial numbers, etc.), and claim that the CT-scan is for the cloned part. In reality, the counterfeit part may have significant manufacturing flaws that create safety risks. However, the consumer of the counterfeit part instance will believe it is safe when provided the CT-scan for the real part instance. There is a clear need to provably tie the cyber-information to a specific part instance to mitigate this vulnerability.

Manufacturers often use quality control checks to ensure that physical parts meet many different types of technical specifications. However, these procedures are not securely linked to each part instance's cyber-data (e.g., certifications), and for many types of complex parts, the quality control checks are extremely expensive and cannot detect all types of defects. Defective or counterfeit parts can also be slipped into a supply chain after quality control has been performed.

In addition, the integrators of the complex systems often rely on their higher tier suppliers to perform these quality checks and assume security in a part's transit through the supply chain. Many lower tier suppliers are much less stringent in determining the origin and authenticity of parts. Each station in a supply chain introduces an additional point where a malicious part could be slipped into a CPS supply chain.

It is with respect to these and other considerations that the various aspects and embodiments of the present disclosure are presented.

SUMMARY

A piezoelectric container for tamper detection and damage monitoring of products within supply chains is described. The piezoelectric container enables tamper monitoring for a variety of items in transit including but not limited to those in the following sectors: medical, pharmaceutical, industrial, automotive, textiles, electronics, gems, precious metals, semiconductor chips, high value items, art, antiquities, and safety critical components. For example, a sealed blister pack of prescription medicine may be stored and shipped in a piezoelectric container. The piezoelectric container can indicate tampering such as punctures, partial or total replacement of container contents, partial removal of contents, or other adverse or unwanted changes to the contents during transport.

In an implementation, a piezoelectric container comprises: a container; and a piezoelectric transducer, wherein the piezoelectric container has a piezoelectric signature that is a unique identifier and is dependent on the structural state of the container.

In an implementation, a system comprises: a piezoelectric container; and a signature generator that generates a first piezoelectric signature of the piezoelectric container.

In an implementation, a method comprises: generating a first piezoelectric signature of a piezoelectric container; generating a second piezoelectric signature of the piezoelectric container; and comparing the first piezoelectric signature with the second piezoelectric signature to determine whether the piezoelectric container has been tampered with. The first piezoelectric signature and the second piezoelectric signature may be two of many piezoelectric signatures.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
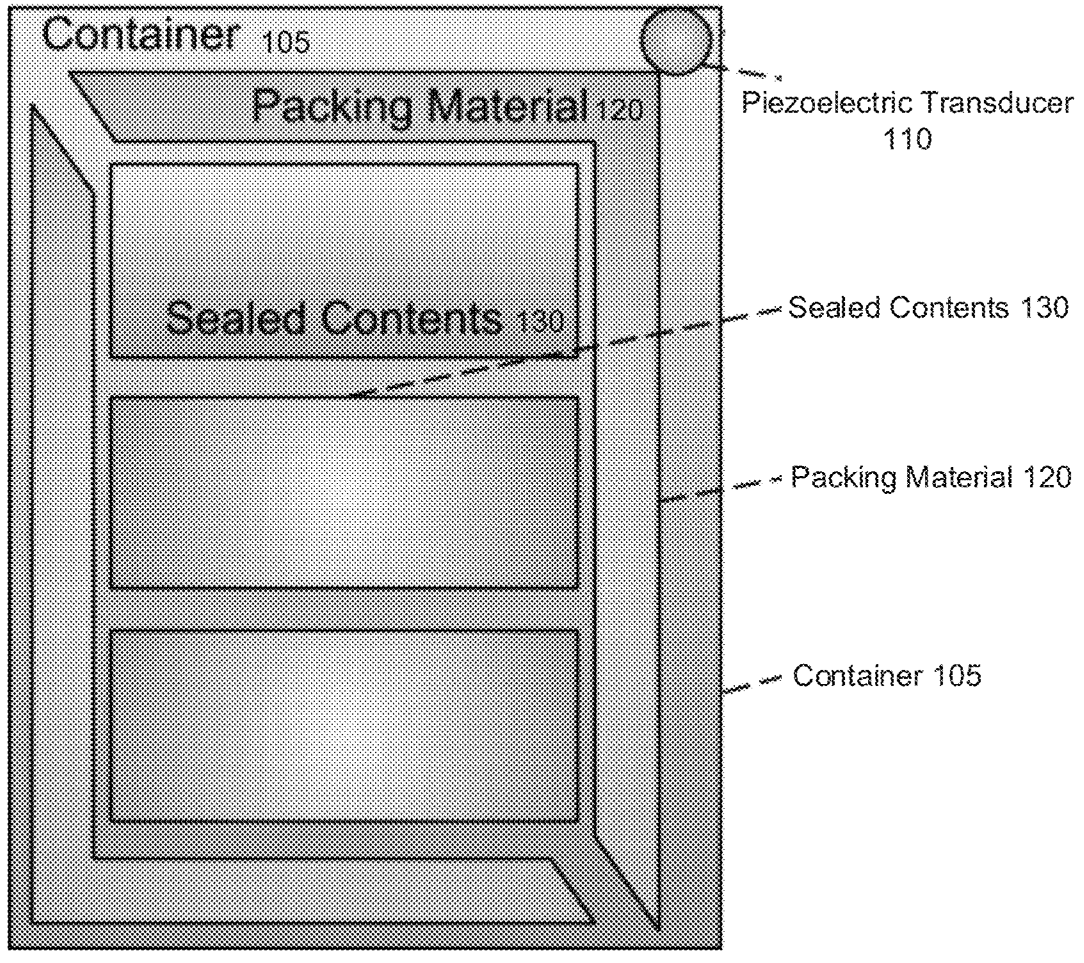
FIG. 1 is an illustration of an implementation of a piezoelectric container.

This description provides examples not intended to limit the scope of the appended claims. The description is not to be taken in a limiting sense, but is made merely for the purpose of illustrating the general principles of the invention, since the scope of the invention is best defined by the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

Various inventive features are described herein that can each be used independently of one another or in combination with other features.

FIG. 1 is an illustration of an implementation of a piezoelectric container 100. The piezoelectric container 100 comprises a container 105 along with a piezoelectric transducer 110. In some implementations, the piezoelectric transducer 110 may be a piezoelectric sensor.

The piezoelectric container 100 is a sealed rigid item container 105 in combination with an attached piezoelectric transducer 110 (e.g., sensor) for the purposes of tracking, verification, and/or structural health monitoring of the container 105 and/or the product (e.g., sealed contents 130) being stored (and perhaps shipped or otherwise sent in transit) in the container 105.

Depending on the implementation, the piezoelectric transducer 110 may be attached to a portion of the container 105 (e.g., using an adhesive) or may be embedded into a portion of the container 105 (e.g., printed onto a portion of the body of the container 105).

In some implementations, the container 105 may comprise packing material 120 and/or one or more sealed contents 130. The packing material 120 may be adhered to the rigid container 105. The sealed contents 130 may comprise one more items being safeguarded and/or transported by the container 105.

A piezoelectric signature of the sealed piezoelectric container 105 is generated. A piezoelectric signature is defined as the data about the impedance of the container (or a part) obtained from the piezoelectric transducer (or sensor). In some implementations, cryptographic elements may be used in generating the piezoelectric signature, as described further herein. It is noted that the terms "impedance identity" and "piezoelectric identity" are considered to be synonymous with "piezoelectric signature," as defined above.

According to an aspect, the piezoelectric container 100 provides a unique signature (also referred to herein as a piezoelectric signature) for tracking shipments in transit between suppliers and integrators. The signature serves as a unique identifier for the container instance. In some implementations, the signature is dependent on the physical state of the contents 130 in the container 105 as well as the structural state of the container 105. The structural state of the container (or a part) is defined as including, but not limited to the microstructure characteristics, mass, stiffness, structural integrity, dampening, geometry, and/or other physical characteristics of the container or the part. If a package (e.g., the container 105, the packing material 120, and/or the sealed contents 130) is tampered with, the signature will change in a detectable way, exposing vulnerabilities in a supply chain.

In an implementation, a piezoelectric transducer 110 (e.g., a piezoelectric sensor) is adhered to or integrated into the container 105. Using multiple frequency values to scan the object and record corresponding impedance response values at each frequency creates a signature (herein called a piezoelectric signature) that is extremely difficult if not impossible to replicate. This allows for identification of a specific container instance, as the piezoelectric signature of separate instances of the same part class differ discernibly. This provides a mechanism to verify the identity of the container 105 that the contents 130 were in, as well as notification to tampering or damage inflicted between the time of scans.

According to another aspect, a piezoelectric container 100 addresses issues with legacy tamper-evident packaging. Current tamper-evident packaging can be difficult for consumers to open. Piezoelectric containers address the challenge of recycling tamper-evident packaging as reusable containers.

While tamper-proof bottles and containers are prolific in manufacturing and shipping, especially in the medical industry, there exists a key flaw in that the containers can be easily replicated. Most tamper-proof containers have some method of sealing such that the seal cannot be easily replaced once removed. This may be a rigid cap that must be broken or a film seal adhered on. Either case shows clear evidence that the container has been tampered with, and some may even include measures such as serial numbers or specialized stickers. However, these measures could be easily replicated on an identical looking bottle, resealed however it was originally sealed.

So long as there are solely easily replicable methods of identifying an instance of a container such as an imprinted serial number or specialized sticker, an attacker will always have the option of producing a nearly identical bottle or container and filling it with counterfeit product. By combining this traditional technology with an attached piezoelectric sensor, such as the piezoelectric transducer 110, one can be sure of whether the contents 130 that were shipped to them is the same as what was packaged, by verifying the tamper-proof container identity.

According to another aspect, a piezoelectric container 100 uses packing material 120 to isolate signatures and protect product. Identities seem to be affected by rigidly connected objects, though this can be simulated by force. The packing material 120 minimizes that. The packing material 120 also increases product safety. The use of packing material 120 ensures product safety and quality and can serve to dampen the effect of the contents 130 inside the container on the signature of the container itself. One or multiple instances of foam or other packing materials may be used at various points of the container 105 to prevent signature interference and limit contents 130 movement or damage.

According to another aspect, a piezoelectric container 100 indicates significant structural changes to the container 105 in transit. Existing shipping vessels do not have structural feedback via a low-cost, non-invasive sensor. Conventional methods to analyze items in transit are costly. Conventional methods of shipping rely on rudimentary observation or costly quality assurance tests to verify the condition of the container and the contents within. This can clearly lead to damage to the item going unnoticed until it has progressed too far along its respective chain of transit or use. Attaching a piezoelectric transducer 110 to the container 105 as described herein allows for even minute damages to the container 105, and thereby possibly the contents 130 within, to be made known to the handler quickly and without the need for time consuming and expensive quality control checks.

As described further herein, piezoelectric sensors are used to measure piezoelectric signatures of parts may serve as a physically unclonable function that can produce unclonable part instance identities. When one of these piezoelectric signatures is combined with cyber-information and signed using existing public key infrastructure (PKI) approaches, it creates a provable binding of cyber-information to a specific part instance. It is extremely expensive and improbable for an attacker to counterfeit a part that replicates the impedance signature of a legitimate part.

Figure 2:
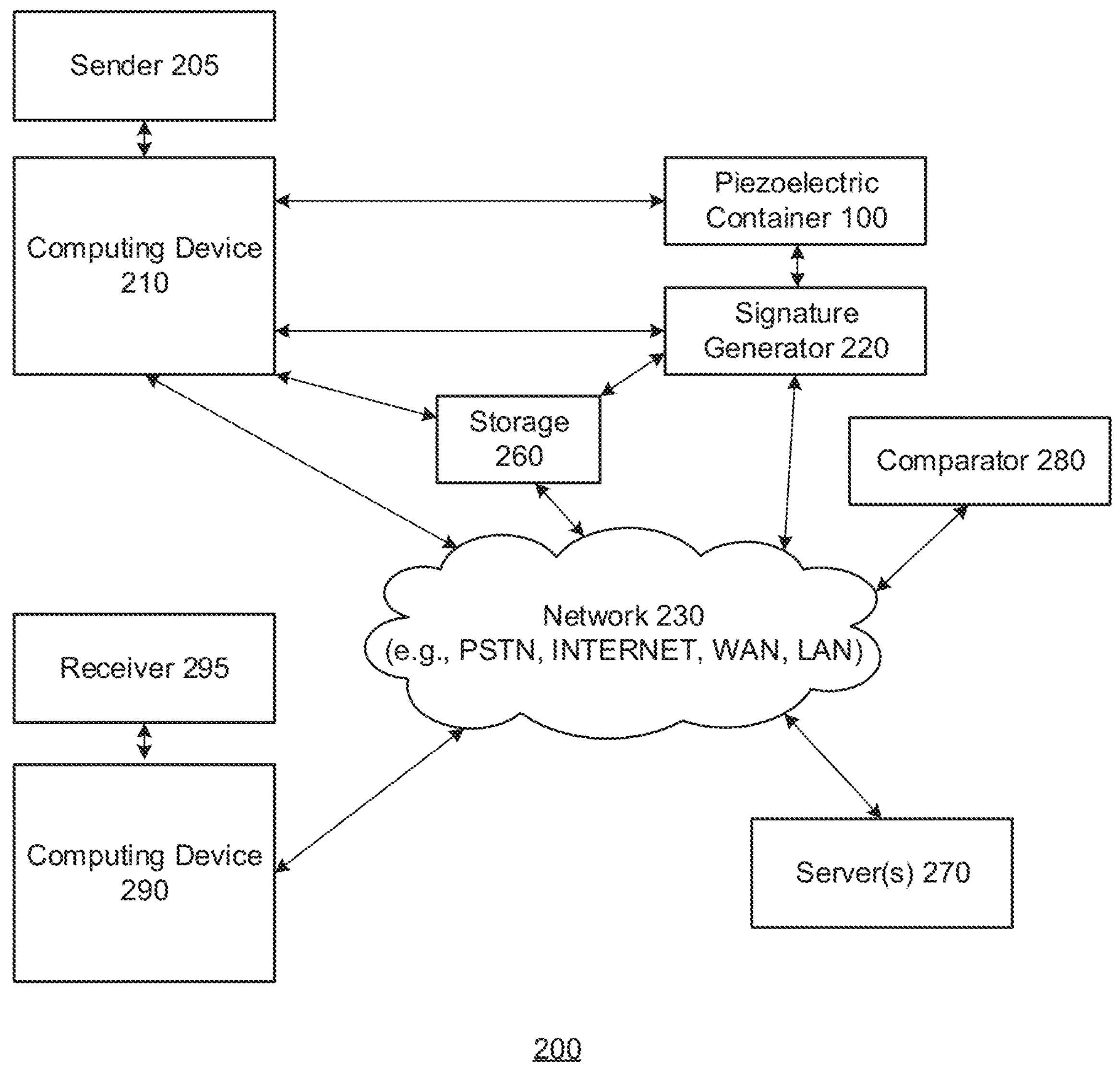
FIG. 2 is an illustration of an exemplary environment for tampering detection using a piezoelectric container.

FIG. 2 is an illustration of an exemplary environment 200 for tampering detection using a piezoelectric container, such as the piezoelectric container 100 described with respect to FIG. 1.

A first computing device 210 may be used by a sender 205 of the piezoelectric container 100, and a second computing device 290 may be used by a receiver 295 of the piezoelectric container 100. The computing device 210 is in communication with a signature generator 220 to generate a first signature (i.e., a first piezoelectric signature) of the sealed piezoelectric container 100, using one or more of the techniques described herein, depending on the implementation.

The first signature may be stored in storage, such as the storage 260. In some implementations, the storage 260 may be cloud-based. Other aspects or implementation contemplated herein may also be cloud-based. With the rise of cloud-based computing, customer experience can be improved by leveraging application programming interfaces (APIs) and software development kits (SDKs) to allow the tamper detection implementations to change in response to a customer's needs. Another advantage of cloud-based storage and implementations is increased reliability, efficiency, and quality experience. Cloud-based implementations may be distributed over a plurality of locations.

When the receiver 295 receives the piezoelectric container 100, they may use the computing device 290 to communicate with the signature generator 220 to generate a second signature (i.e., a second piezoelectric signature) of the sealed piezoelectric container 100, using one or more of the techniques described herein, depending on the implementation.

The receiver 295 may then send the second signature to a comparator 280 to compare the first signature with the second signature to determine whether the piezoelectric container 100 (and/or its contents therein) has been tampered with. In some implementations, the comparator 280 retrieves the first signature from the storage 260 and determines a difference between the first signature and the second signature. When the first signature and the second signature are identical (or within a predetermined amount of difference), then it is determined that the piezoelectric container 100 (and its contents therein) has not been tampered with. When the first signature and the second signature are not identical (or have a difference greater than a predetermined amount), then it is determined that the piezoelectric container 100 (and its contents therein) has been tampered with. An indication may be provided from the comparator to the computing device 210 and/or the computing device 290.

The signature generator 220, the comparator 280, and/or the storage 260 may reside on a computing device (or across multiple computing devices), such as the computing device 210 or the computing device 290, or some other computing device, depending on the implementation. In some implementations, the signature generator 220, the comparator 280, and/or the storage 260 may reside in one or more servers 270, which may be or comprise one or more cloud-based computing devices.

The computing device 210, the computing device 290, the server(s) 270, the signature generator 220, the comparator 280, and/or the storage 260 may be in communication with one another through a network 230. The network 230 may be a variety of network types including the public switched telephone network (PSTN), a cellular telephone network, and a packet switched network (e.g., the Internet). The network types are provided by way of example and are not intended to limit types of networks used for communications.

Although only one computing device 210, one computing device 290, one server(s) 270, one signature generator 220, one comparator 280, and one storage 260 are shown in FIG. 2, there is no limit to the number of computing devices 210, computing devices 290, servers 270, signature generators 220, comparators 280, and storages 260 that may be supported.

Figure 6:
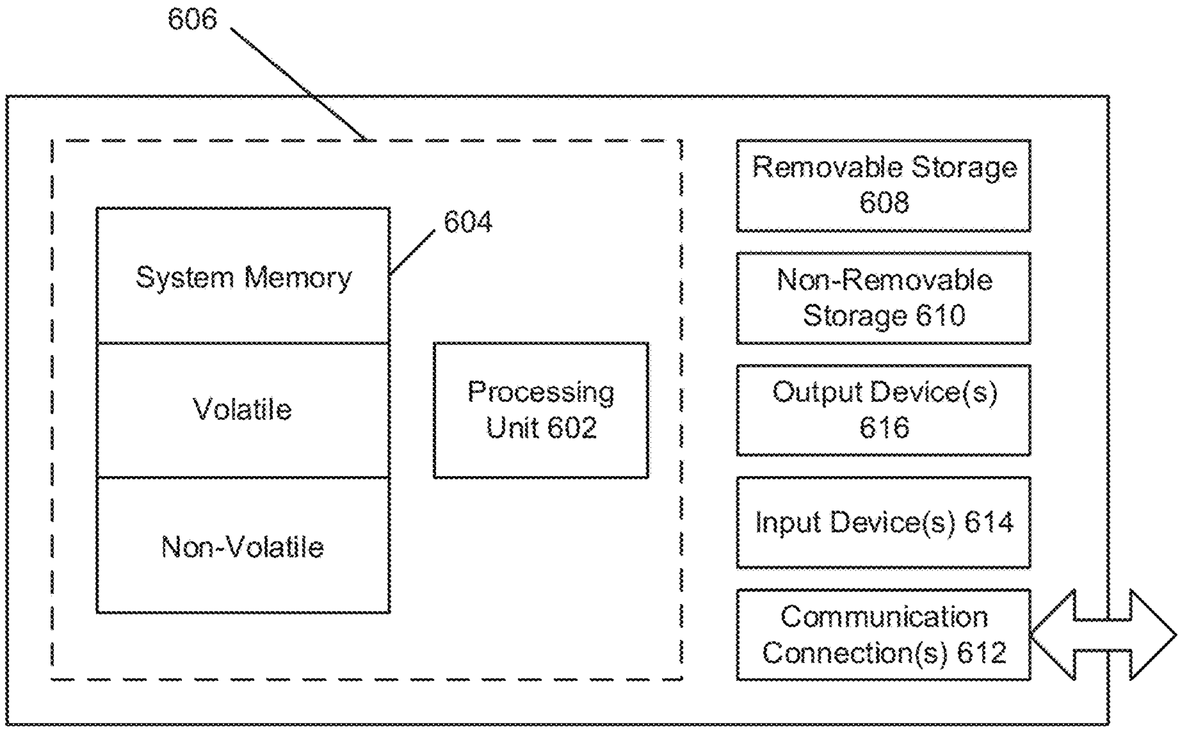
FIG. 6 shows an exemplary computing environment in which example embodiments and aspects may be implemented.

The computing device 210, the computing device 290, the server(s) 270, the signature generator 220, the comparator 280, and the storage 260 may be implemented using a variety of computing devices such as smartphones, desktop computers, laptop computers, tablets, etc. Other types of computing devices may be supported. A suitable computing device is illustrated in FIG. 6 as the computing device 600.

It is noted that each individual part (e.g., container 105) instance can be uniquely identified by its piezoelectric signature (which is unique to each part instance due to inherent variance in the manufacturing process, the sensor, and the sensor configuration) without reliance on a printed or physical serial number. Moreover, the origin of parts can be verified by checking if the piezoelectric signature fora part has been signed by the private key of the expected source of the part. Additionally, counterfeits or unauthorized productions of the part can be detected by measuring a piezoelectric signature and comparing it against the set of signed/licensed piezoelectric signatures for valid part instances. Cyber-information can be provably tied to a specific physical part instance's unique and unclonable piezoelectric signature using cryptographic techniques.

Regarding signatures that may be used in accordance with embodiments and implementations herein, signed physically unclonable identities are now described. Physically unclonable identities and methods are used to provably link cyber-information to specific part instances. The approach is based on using (i) a physical measurement technique (electromechanical impedance) to provide parts with an unclonable physical identity and (ii) public key infrastructure (PKI) approaches to sign impedance measurements and provably bind cyber-information to specific part instances. This approach is referred to herein as Signed Physically Unclonable iDentities (SPUDs).

SPUDs rely on the ability to generate a unique identity for nearly every rigid physical part instance without relying on a physical or printed identifier. The identity of the part instance is based on a physically unclonable function and makes production of another part with the same identity extremely difficult or cost prohibitive. The term physically unclonable identity as used herein is the output read from the physically unclonable function. SPUDs make counterfeiting a part instance with an existing part instance's identity much more expensive.

Once a part's identity cannot be forged, the identity can be incorporated into traditional signed messages. These messages can carry critical cyber-information regarding parts, such as certifications from manufacturers, IP holders, or testing facilities. Because the messages are signed and carry the unclonable identity of a part, information and the sources of that information can be provably tied to a specific part instance. Additionally, detection of counterfeits and verification of cyber-information attached to parts can be performed using well understood PKI techniques.

Regarding measuring part piezoelectric signatures, it is noted that piezoelectric (e.g., lead zirconate titanate, PZT) wafers may be used as collocated sensors and actuators to simultaneously excite the structure of interest and measure its electromechanical impedance response. Due to the coupled electromechanical characteristics of piezoelectric materials, the electrical impedance of the PZT wafer is related to the mechanical impedance of the host structure, as depicted in FIGS. 3 and 4.

Figure 3:
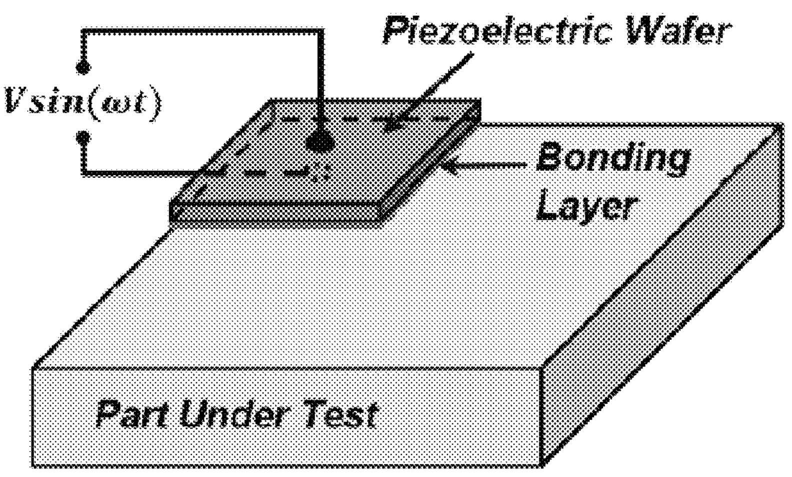
FIGS. 3 and 4 show schematic diagrams of implementations of physical measurement of piezoelectric signatures.
Figure 4:
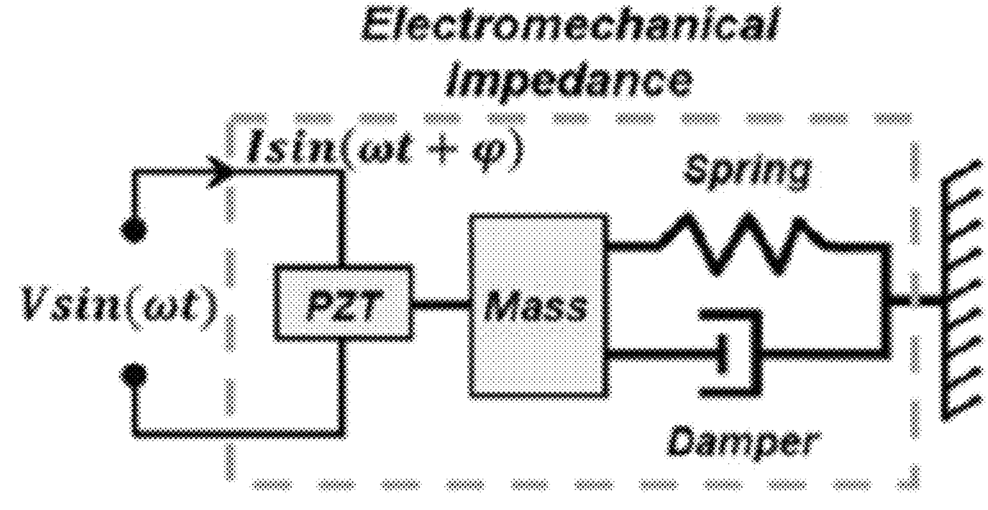

FIGS. 3 and 4 show schematic diagrams of implementations 300, 400, respectively, of physical measurement of piezoelectric signatures. More particularly, FIGS. 3 and 4 show a representative experimental setup with schematics of the instrumentation of the part under test and the equivalent single degree of freedom representation of the coupled system, respectively. The electrical impedance of the PZT wafer, as a function of frequency ω, can be expressed as $$Z(\omega)=\left[i\omega\frac{bl}{h}\left(\frac{d_{13}^2}{s_{11}^E}\left(\frac{\tan(kl)}{kl}\left(\frac{Z_{PZT}}{Z_{PZT}+Z_{ST}}\right)-1\right)+\varepsilon_{33}^{\sigma}\right)\right]^{-1}$$

where: $Z_{PZT}$ is the piezoelectric transducer short circuit impedance, $Z_{St}$=f(m, k, ζ) is the mechanical impedance of the part under test. $d_{13}$ is the piezoelectric coupling coefficient, $$s_{11}^E$$

is the mechanical compliance of the piezoelectric material measured at zero electric field, $$\epsilon_{33}^{\sigma}$$

is the materials permittivity measured at zero stress.

$$k=w(\varrho s_{11}^E)1/2$$

is the wave number, is the density of the piezoelectric material, b, h, 2 l are the piezoelectric patch width, thickness and length, respectively. Thus, the fundamental characteristics of the part under test, such as its mass (m), stiffness (k), and damping (ζ), can be inspected through the easily measured electrical impedance of the PZT wafer.

The fundamental basis of this technique is that the presence of damage (i.e., physical change) in a part will alter the inherent mass, stiffness and damping characteristics of the structure, which in turn will be reflected in the measured dynamic response.

Electromechanical impedance monitoring works for detecting malicious changes to parts as it is responsive to small changes/defects in fabricated parts. However, the use of impedance measurements as a comparative evaluation technique across different components is inherently limited, as there always existed variation in the signatures from individual parts produced with the exact same processes and part specification.

An unclonable cyber-physical identity with piezoelectric signatures is described. If a system integrator could know without question the real identity of a part, they could (i) check its origin and (ii) access the related digital thread data that has been accumulated throughout its lifecycle (e.g., certifications, IP licensing, etc.). The naive approach to solving this identity problem is to simply apply a serial number to the part itself. The manufacturer then provides a database of authorized part serial numbers that the part can be checked against. For example, the part's serial number can be engraved into the part during machining/molding, 3D printed directly onto its surface, or painted on as the last step in manufacturing. However, the serial numbers can be easily cloned and applied to illegitimate parts, so that they match up against a legitimate entry in a part database. Engraved/embossed identifiers can be cloned via 3D scanning and/or removed through destructive means. The $1.82 trillion in estimated global counterfeiting by 2020 speaks to the limitations of current approaches.

With the SPUD approach, the signature of the part is intrinsic to the physical state of the part after a piezoelectric sensor is attached. If either the sensor, the part, or the attachment of the sensor is altered, the identity of the part will change. More formally, attaching the piezoelectric sensor to the part creates an unclonable identity of the form:

$$I(p_i, s_j, a_k, \omega_m, \omega_n)=\begin{bmatrix} Z(\omega_m) \\ Z(\omega_{m+b}) \\ \vdots \\ Z(\omega_n) \end{bmatrix}$$

where: I is the piezoelectric signature of a part that is a physically unclonable function of the part, piezoelectric sensor, sensor attachment, and frequency range that impedance is measured at; $p_i$ is the unique part instance; $s_j$ is the unique piezoelectric sensor instance; $a_k$ is the unique attachment of the piezoelectric sensor to the part; b is the frequency step size; $\omega_m$ is the lower bound frequency that impedance is measured at; $\omega_n$ is the upper bound frequency that impedance is measured at.

The physically unclonable identity, I, is produced by attaching a piezoelectric sensor to a physical part instance (e.g., gluing the sensor to the part instance). The physically unclonable identity is based on the unique impedance characteristics produced by the combination of the part $p_i$, the piezoelectric sensor $s_j$, and the attachment of the sensor $a_k$. The identity is read by activating the sensor and measuring impedance across the frequencies $\omega_m \ldots \omega_n$. The identity of the part is the measured impedance at each frequency in the target frequency range.

The $p_i$, $s_j$, $a_k$> triple values cannot be engineered to clone a piezoelectric signature. I provides a means for producing unclonable part identity functions that are intrinsic to the part, sensor, and precise attachment of the sensor to the part. At manufacturing time, the $\langle p_i, s_j, a_k \rangle$ triple can be produced by attaching a piezoelectric sensor to a part, which then produces an unclonable identity for the part. Changing either the part instance, sensor instance, or attachment (e.g., placement, gluing, etc.) fundamentally changes the triple and creates a different set of impedance characteristics across the measured frequencies (changes the identity).

The current cost of piezoelectric sensors in small volumes is on the order of $1 and the impedance analyzer needed to read signatures can range from $100 for a custom Arduino-based device to over $20,000 for a high-end commercial analyzer. The analyzer cost is fixed and only a single analyzer is needed to read signatures for multiple parts. However, the added sensor cost will limit application to domains where the added per-part cost is not cost-prohibitive and the added security is necessary.

Cyber-physical information association and provenance is described. To protect against an attacker counterfeiting a part, copying a serial number from a legitimate part, and claiming that it has a specific certification that was really generated for the legitimate part instance, use PKI. The open problem with physical parts is that there is no connection between messages signed with a private key and a physical part. A part may have a serial number painted on it that is listed in a signed message, but nothing stops an attacker from generating counterfeit parts with that same serial number.

There can never be a proven connection between a signed message and a specific physical part instance. The link between the cyber-information and the physical parts is inherently weak and a low cost attack point. The SPUD approach uses PKI to allow IP owners, certifiers, customs agencies, and other producers of information about a specific physical part instance to sign the combined piezoelectric signature and cyber-information of a part to produce signed messages that can travel with the part to prove specific properties. The signed messages carry the physically unclonable piezoelectric signature of the part instance and hence can be provably connected back to the specific physical part instance held by the receiver of the message. Any holder of the physical part instance can measure the unclonable piezoelectric signature and then compare it to the identities in signed messages they have received with cyber-information about the part instance.

For example, the IP holder of the design of a part can sign the piezoelectric signature to prove that the production of the part was authorized and properly licensed. A certifier can test a part instance and sign the combination of the piezoelectric signature and digital data to bind the certification to the specific physical part instance. The part holder, A, uses their private key, $KA^{-1}$, to sign the part identity and generate a message that can be sent to an entity, B, along with the physical part, to verify properties of the physical part:

$$A \to B: \{C, I(p_i, s_j, a_k, \omega_m, \omega_n), O\}K_A^{-1}$$

where: A is the certifier that will assert a property of the part $p_i$; B is a receiver of a physical part that needs to verify its integrity and information about it; C is the set of cyber-information being asserted by A (e.g., licensed, certified, etc.); $I(p_i, s_j, a_k, \omega_m, \omega_n)$ is the unclonable identity of a part (i.e., piezoelectric signature); O is other parameters required for the signature and piezoelectric signature matching; $KA^{-1}$ is the private key for A.

The signed assertion messages are produced by the different entities involved in attaching cyber-information to the part instance. For example, the manufacturer may not be the IP holder. The unclonable signatures can be produced in the manufacturing facility and sent to the IP holder for signature. The IP holder then sends back the signed assertion messages for each part instance indicating that they were licensed for production.

The signed assertion messages can be transmitted with the part (e.g., by including them in the packaging) or via a typical central database approach. However, the central database is not required in the approach. An entity, B, that wants to verify that cyber-information, C, was asserted by entity A for a specific physical part instance, $p_i$, uses the public key, KA, of entity A, to verify that A is the source of the message, that the cyber-information in the message matches C, and that the piezoelectric signature measured from the physical part matches the signature in the message. Additional parameters, O, can be included in the message and may include physical measurement parameters for obtaining the piezoelectric signature, calibrating equipment, timestamping, nonces, etc.

With the SPUD approach, piezoelectric signatures of the exact same part instance, but not different part instances, are compared against each other. For example, if a part is certified and then an attacker drills a hole in the part, the assertion should no longer hold for the part. Modifying the physical properties of the part (e.g., drilling a hole and changing its geometry) will impact the piezoelectric signature. If the part consumer receives a part, obtains its piezoelectric signature, and it does not exactly match the signed piezoelectric signature, then the part may have been tampered with or damaged at some point and hence its attached assertions should no longer match the part.

Currently, the cost to produce a counterfeit part is often lower than to produce a legitimate part, since the counterfeiter may not adhere to legal, licensing, labor, quality, or other standards of a legitimate manufacturer. A key advantage of a SPUD is that it correlates with geometry and microstructural properties of a part that determine quality and performance. To produce a counterfeit part that replicates the piezoelectric signature of a legitimate part, the counterfeiter needs to produce a part that is equivalent in quality to the legitimate part.

An important ramification of the approach is that to generate a counterfeit part that produces a collision with the piezoelectric signature of a legitimate part, one must produce a physical copy that is similar in quality and performance; otherwise, the geometry and microstructure of the physical part will produce a different piezoelectric signature. This has the ramification that security is immediately improved by: 1) ensuring that any counterfeit parts will be similar in cost to produce as the defender's parts and 2) the quality of the counterfeits will need to be high in order to collide with a signature for a legitimate good part. First, to have any possibility of a signature collision, the material, process, and geometrical properties of the part, all of which determine the quality of the part, must be identical or near identical to a legitimate part.

Counterfeiters cannot get away with producing poor quality parts and hope to collide with a legitimate piezoelectric signature as quality failures will inherently move their signatures into different parts of the piezoelectric signature address space from legitimate good parts.

Piezoelectric signatures are unique to individual parts, even among a set of seemingly identical, unflawed parts with identical geometry, material specification, and manufacturing process.

Piezoelectric signatures are stable across repeated measurements to within a tolerance a that is easily distinguishable from other part instances. That is, the variation between repeated measurements of the same part does not introduce so much noise that a piezoelectric signature collision is likely.

Although physical countermeasures (e.g., holographic serial numbers, etc.) have been studied for a long time, counterfeiting is still a global problem that affects safety-critical systems, such as aeronautics. Using piezoelectric sensors to measure the piezoelectric signatures of physical parts will serve as a physically unclonable function for determining an intrinsic identity of a part. These identifiers may be used solely for identification purposes to bind cyber-information to and not as the source of cryptographic material with sufficient entropy for encryption. Traditional physical parts (e.g., screws, impellers, brackets) may be secured in this manner. Once a piezoelectric signature is measured for a physical part instance, well-established PKI mechanisms can be used to provably bind safety and other cyber-information to a specific part instance.

There are no known ways to produce two parts of identical piezoelectric signature using the state of the art knowledge in manufacturing.

Figure 5:
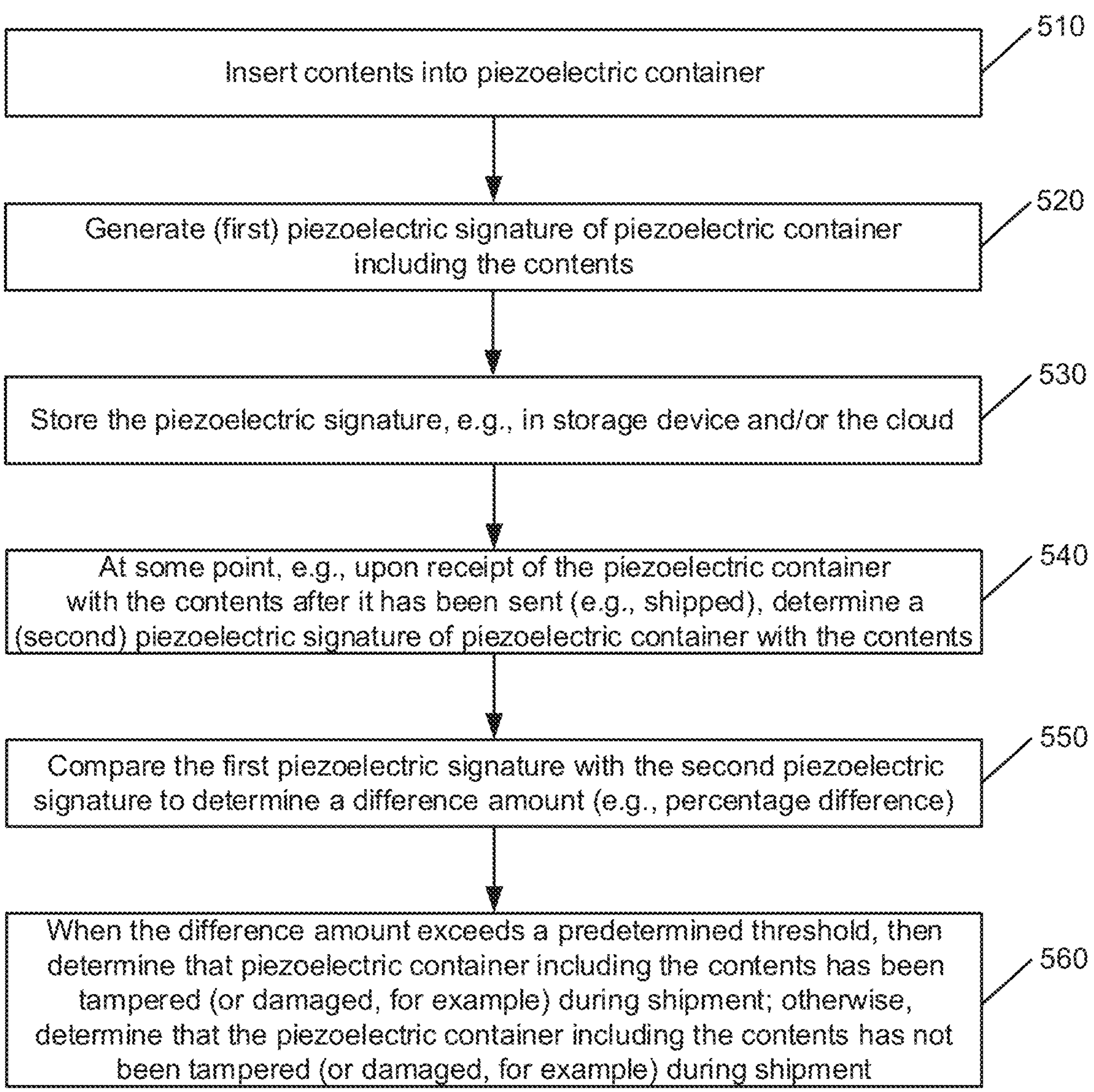
FIG. 5 is an operational flow of an implementation of a method for tampering detection using a piezoelectric container.

FIG. 5 is an operational flow of an implementation of a method 500 for tampering detection using a piezoelectric container, such as the piezoelectric container 100.

At 510, contents are inserted or otherwise placed into a piezoelectric container 100 and the piezoelectric container 100 is sealed. In the manner, the contents become sealed contents, such as sealed contents 130.

At 520, a (first) piezoelectric signature of the piezoelectric container including the sealed contents is generated. The piezoelectric signature may be generated using the signature generator 220, for example.

At 530, the piezoelectric signature is stored in storage 260, such as in a storage device, memory device, and/or the cloud.

The sealed piezoelectric container 100 may be sent to a receiver (e.g., a recipient), where it may be received.

At 540, at some point, the receiver may receive the sealed piezoelectric container 100 and have a (second) piezoelectric signature generated of the piezoelectric container including the sealed contents.

At 550, the first piezoelectric signature is compared with the second piezoelectric signature to determine a difference amount (e.g., a percentage difference). The first piezoelectric signature may be retrieved or otherwise obtained or received from the storage by a computing device doing the comparison.

At 560, when the difference amount exceeds a predetermined threshold such as exceeding a predetermined percentage amount difference (or when the two signatures are not identical, in some implementations), then it is determined that the piezoelectric container including the contents may have been tampered (or damaged, for example) during shipment or transit; otherwise, it is determined that the piezoelectric container including the contents has not been tampered (or damaged, for example) during shipment or transit. The difference may be determined using any known technique for comparing two signatures.

In some implementations, systems and methods are provided for protecting the integrity and authenticity of a medical item, comprising a container for one or more medical-related items, including, but not limited to, prescription medications, over the counter medications, medical devices, surgical devices, test supplies, with a first attached piezoelectric sensor, a first piezoelectric signature read from the first piezoelectric sensor, and one or more messages containing additional piezoelectric signatures, the messages having had a cryptographic operation applied to them, and a verification process for comparing the first piezoelectric signature with one or more of the additional piezoelectric signatures.

In some implementations, systems and methods are provided for protecting the integrity and authenticity of products sold through an e-commerce site, comprising a container for one or more items sold on an e-commerce site, including items that may also be sold through a brick and mortar store, a first piezoelectric signature read from the first piezoelectric sensor, and one or more messages containing additional piezoelectric signatures, the messages having had a cryptographic operation applied to them, and a verification process for comparing the first piezoelectric signature with one or more of the additional piezoelectric signatures. Depending on the implementation, the verification process is provided by one or more of the intellectual property holder, manufacturer, or distributor of the e-commerce item.

In some implementations, systems and methods are provided for protecting the integrity and authenticity of aviation products, comprising a container for one or more aviation products, including but not limited to structural aviation parts, mechanical aviation parts, electronic components used in aircraft or aircraft related devices, a first piezoelectric signature read from the first piezoelectric sensor, and one or more messages containing additional piezoelectric signatures, the messages having had a cryptographic operation applied to them, and a verification process for comparing the first piezoelectric signature with one or more of the additional piezoelectric signatures. Depending on the implementation, the verification process is provided by one or more of the intellectual property holder, manufacturer, or distributor of the aviation product or equipment.

In some implementations, systems and methods are provided for protecting the integrity and authenticity of automotive products, comprising a container for one or more automotive products, including but not limited to structural automotive parts, mechanical automotive parts, electronic components used in motor vehicles or motor vehicles related devices, a first piezoelectric signature read from the first piezoelectric sensor, and one or more messages containing additional piezoelectric signatures, the messages having had a cryptographic operation applied to them, and a verification process for comparing the first piezoelectric signature with one or more of the additional piezoelectric signatures. Depending on the implementation, the verification process is provided by one or more of the intellectual property holder, manufacturer, or distributor of the automotive product or equipment.

In some implementations, systems and methods are provided for protecting the integrity and authenticity of chemical manufacturing products (e.g., including but not limited to medicine and pharmaceuticals), comprising a container for one or more substances or products, a first piezoelectric signature read from the first piezoelectric sensor, and one or more messages containing additional piezoelectric signatures, the messages having had a cryptographic operation applied to them, and a verification process for comparing the first piezoelectric signature with one or more of the additional piezoelectric signatures.

In some implementations, systems and methods are provided for protecting the integrity and authenticity of electrical components, equipment and appliance products, comprising a container for one or more electrical products, including but not limited to circuits, chips, computers and computer parts, handheld devices and their associated parts, partially or fully built equipment or appliances such as generators, toasters, washers or dryers, etc., a first piezoelectric signature read from the first piezoelectric sensor, and one or more messages containing additional piezoelectric signatures, the messages having had a cryptographic operation applied to them, and a verification process for comparing the first piezoelectric signature with one or more of the additional piezoelectric signatures. Depending on the implementation, the verification process is provided by one or more of the intellectual property holder, manufacturer, or distributor of the electrical product or equipment.

In some implementations, systems and methods are provided for protecting the integrity and authenticity of equipment or components of equipment used for procuring of natural resources, such as mining, logging and drilling/oil and gas extraction, a first piezoelectric signature read from the first piezoelectric sensor, and one or more messages containing additional piezoelectric signatures, the messages having had a cryptographic operation applied to them, and a verification process for comparing the first piezoelectric signature with one or more of the additional piezoelectric signatures. Depending on the implementation, the verification process is provided by one or more of the intellectual property holder, manufacturer, or distributor of the product or equipment.

In some implementations, systems and methods are provided for protecting the integrity and authenticity of equipment or components of equipment used for processing and manufacturing of natural resources, including but not limited to paper manufacturing, metal manufacturing, plastic manufacturing, including the product of aforementioned processes both listed and implied, a first piezoelectric signature read from the first piezoelectric sensor, and one or more messages containing additional piezoelectric signatures, the messages having had a cryptographic operation applied to them, and a verification process for comparing the first piezoelectric signature with one or more of the additional piezoelectric signatures. Depending on the implementation, the verification process is provided by one or more of the intellectual property holder, manufacturer, or distributor of the product or equipment.

In some implementations, systems and methods are provided for protecting the integrity and authenticity of equipment or components of equipment used in manufacturing sectors, including their products, such as textile and textile product mills, apparel manufacturing, wood product manufacturing, petroleum and coal product manufacturing, chemical manufacturing, nonmetallic mineral product manufacturing, primary and fabricated metal manufacturing, machinery manufacturing, computer and electronic product manufacturing, electrical equipment, appliance, and component manufacturing, transportation equipment manufacturing, furniture and related product manufacturing, food manufacturing, beverage and tobacco product manufacturing and miscellaneous manufacturing, a first piezoelectric signature read from the first piezoelectric sensor, and one or more messages containing additional piezoelectric signatures, the messages having had a cryptographic operation applied to them, and a verification process for comparing the first piezoelectric signature with one or more of the additional piezoelectric signatures. Depending on the implementation, the verification process is provided by one or more of the intellectual property holder, manufacturer, or distributor of the product or equipment.

FIG. 6 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing aspects described herein includes a computing device, such as computing device 600. In its most basic configuration, computing device 600 typically includes at least one processing unit 602 and memory 604. Depending on the exact configuration and type of computing device, memory 604 may be volatile (such as random access memory (RAM)), non-volatile (such as read-only memory (ROM), flash memory, etc.), or some combination of the two. This most basic configuration is illustrated in FIG. 6 by dashed line 606.

Computing device 600 may have additional features/functionality. For example, computing device 600 may include additional storage (removable and/or non-removable) including, but not limited to, magnetic or optical disks or tape. Such additional storage is illustrated in FIG. 6 by removable storage 608 and non-removable storage 610.

Computing device 600 typically includes a variety of computer readable media. Computer readable media can be any available media that can be accessed by the device 600 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 604, removable storage 608, and non-removable storage 610 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of computing device 600.

Computing device 600 may contain communication connection(s) 612 that allow the device to communicate with other devices. Computing device 600 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

In an implementation, a piezoelectric container comprises: a container; and a piezoelectric transducer, wherein the piezoelectric container has a piezoelectric signature that is a unique identifier and is dependent on the structural state of the container.

Implementations may include some or all of the following features. The piezoelectric transducer is a piezoelectric sensor. The piezoelectric transducer is attached to the container or is embedded into the container. The piezoelectric container further comprises at least one of packing material or sealed contents. The piezoelectric signature is further dependent on the physical state of the at least one of the packing material or the sealed contents. The piezoelectric signature is based on a piezoelectric signature of the container and cyber-information. The piezoelectric signature is signed using a public key infrastructure (PKI) technique.

In an implementation, a system comprises: a piezoelectric container; and a signature generator that generates a first piezoelectric signature of the piezoelectric container.

Implementations may include some or all of the following features. The signature generator generates a second piezoelectric signature of the piezoelectric container, and further comprising a comparator that compares the first piezoelectric signature with the second piezoelectric signature to determine whether the piezoelectric container has been tampered with. When the first piezoelectric signature and the second piezoelectric signature are identical or within a predetermined amount of difference, then it is determined that the piezoelectric container has not been tampered with, and wherein when the first piezoelectric signature and the second piezoelectric signature are not identical or have a difference greater than a predetermined amount, then it is determined that the piezoelectric container has been tampered with. The piezoelectric container comprises sealed contents, and wherein the first piezoelectric signature and the second piezoelectric signature are each dependent on the structural state of the container and the physical state of the sealed contents. The first piezoelectric signature and the second piezoelectric signature are each based on a piezoelectric signature of the piezoelectric container and cyber-information. The first piezoelectric signature is signed using a public key infrastructure (PKI) technique. The system further comprises cloud-based storage that stores the first piezoelectric signature.

In an implementation, a method comprises: generating a first piezoelectric signature of a piezoelectric container; generating a second piezoelectric signature of the piezoelectric container; and comparing the first piezoelectric signature with the second piezoelectric signature to determine whether the piezoelectric container may have been tampered with.

Implementations may include some or all of the following features. The method further comprises: storing the first piezoelectric signature in cloud-based storage after generating the first piezoelectric signature and prior to generating the second piezoelectric signature; and retrieving the first piezoelectric signature from the cloud-based storage prior to comparing the first piezoelectric signature with the second piezoelectric signature, wherein the comparing uses the retrieved first piezoelectric signature. The method further comprises storing contents in the piezoelectric container and sealing the piezoelectric container prior to generating the first piezoelectric signature. The first piezoelectric signature and the second piezoelectric signature are each dependent on the structural state of the piezoelectric container and the physical state of the contents sealed in the piezoelectric container. The first piezoelectric signature and the second piezoelectric signature are each further dependent on the physical state of packing material in the piezoelectric container. Generating the second piezoelectric signature of the piezoelectric container is performed upon receipt of the piezoelectric container from transit. When the comparing identifies that the first piezoelectric signature and the second piezoelectric signature are identical or within a predetermined amount of difference, then it is determined that the piezoelectric container has not been tampered with, and wherein when the first piezoelectric signature and the second piezoelectric signature are identified as not identical or have a difference greater than a predetermined amount, then it is determined that the piezoelectric container has been tampered with. The first piezoelectric signature and the second piezoelectric signature are each based on a piezoelectric signature of the piezoelectric container and cyber-information. The first piezoelectric signature is signed using a public key infrastructure (PKI) technique.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

As used herein, the singular form "a," "an," and "the" include plural references unless the context clearly dictates otherwise. As used herein, the terms "can," "may," "optionally," "can optionally," and "may optionally" are used interchangeably and are meant to include cases in which the condition occurs as well as cases in which the condition does not occur.

The term "comprising" and variations thereof as used herein is used synonymously with the term "including" and variations thereof and are open, non-limiting terms.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A piezoelectric container comprising:

a container;

at least one of packing material or sealed contents; and a piezoelectric transducer, wherein the piezoelectric container has a piezoelectric signature that is a unique identifier and is determined in-part by an electrical impedance of a part contained within the piezoelectric container to which the piezoelectric transducer is attached, wherein the unique identifier of piezoelectric signature is further determined by the sealed contents within the piezoelectric container, wherein the piezoelectric transducer is attached to the container or is embedded into the container, and wherein the piezoelectric signature is further dependent on a physical state of the at least one of the packing material or the sealed contents.

2. The piezoelectric container of claim 1, wherein the piezoelectric signature is dependent on a structural state of the container.

3. The piezoelectric container of claim 1, wherein the piezoelectric transducer is a piezoelectric sensor.

4. The piezoelectric container of claim 1, wherein the piezoelectric signature is based on a piezoelectric signature of the container and cyber-information.

5. The piezoelectric container of claim 1, wherein the piezoelectric signature is signed using a public key infrastructure (PKI) technique.

6. A system comprising:

a piezoelectric container; and a signature generator that generates a first piezoelectric signature of the piezoelectric container and a second piezoelectric signature of the piezoelectric container, wherein the piezoelectric container comprises sealed contents, wherein the first piezoelectric signature is determined in-part by an electrical impedance of the sealed contents within the piezoelectric container, wherein a unique identifier of piezoelectric signature is further determined by the sealed contents within the piezoelectric container, wherein a piezoelectric transducer is attached to the piezoelectric container or is embedded into the piezoelectric container, and wherein the first piezoelectric signature and the second piezoelectric signature are each dependent on a physical state of the sealed contents.

7. The system of claim 6, further comprising a comparator that compares the first piezoelectric signature with the second piezoelectric signature to determine whether the piezoelectric container has been tampered with.

8. The system of claim 7, wherein when the first piezoelectric signature and the second piezoelectric signature are identical or within a predetermined amount of difference, then it is determined that the piezoelectric container has not been tampered with, and wherein when the first piezoelectric signature and the second piezoelectric signature are not identical or have a difference greater than a predetermined amount, then it is determined that the piezoelectric container has been tampered with.

9. The system of claim 7, wherein the first piezoelectric signature and the second piezoelectric signature are each based on a piezoelectric signature of the piezoelectric container and cyber-information.

10. The system of claim 6, wherein the first piezoelectric signature is signed using a public key infrastructure (PKI) technique.

11. The system of claim 6, further comprising cloud-based storage that stores the first piezoelectric signature.

12. A method comprising:

attaching a piezoelectric transducer to a piezoelectric container or embedding a piezoelectric transducer into the piezoelectric container;

generating a first piezoelectric signature of a piezoelectric container that is determined in-part by an electrical impedance of sealed contents contained within the piezoelectric container and determined in-part by sealed contents within the piezoelectric container;

generating a second piezoelectric signature of the piezoelectric container; and comparing the first piezoelectric signature with the second piezoelectric signature to determine whether the piezoelectric container has been tampered with, wherein the first piezoelectric signature and the second piezoelectric signature are each dependent on a structural state of the piezoelectric container and a physical state of the sealed contents in the piezoelectric container.

13. The method of claim 12, further comprising:

storing the first piezoelectric signature in cloud-based storage after generating the first piezoelectric signature and prior to generating the second piezoelectric signature; and retrieving the first piezoelectric signature from the cloud-based storage prior to comparing the first piezoelectric signature with the second piezoelectric signature, wherein the comparing uses a retrieved first piezoelectric signature.

14. The method of claim 12, further comprising storing contents in the piezoelectric container and sealing the piezoelectric container prior to generating the first piezoelectric signature.

15. The method of claim 14, wherein the first piezoelectric signature and the second piezoelectric signature are each further dependent on a physical state of packing material in the piezoelectric container.

16. The method of claim 12, wherein the generating the second piezoelectric signature of the piezoelectric container is performed upon receipt of the piezoelectric container from transit.

17. The method of claim 12, wherein when the comparing identifies that the first piezoelectric signature and the second piezoelectric signature are identical or within a predetermined amount of difference, then it is determined that the piezoelectric container has not been tampered with, and wherein when the first piezoelectric signature and the second piezoelectric signature are identified as not identical or have a difference greater than a predetermined amount, then it is determined that the piezoelectric container has been tampered with.

18. The method of claim 12, wherein the first piezoelectric signature and the second piezoelectric signature are each based on a piezoelectric signature of the piezoelectric container and cyber-information.

19. The method of claim 12, wherein the first piezoelectric signature is signed using a public key infrastructure (PKI) technique.

20. A system comprising:

a computing device; and a comparator in communication with the computing device, wherein the comparator compares a first piezoelectric signature of a piezoelectric container that is determined in-part by an electrical impedance of sealed contents contained within the piezoelectric container and determined in-part by sealed contents within the piezoelectric container with a second piezoelectric signature of the piezoelectric container to determine whether the piezoelectric container has been tampered with, wherein a piezoelectric transducer is attached to the piezoelectric container or is embedded into the piezoelectric container, and wherein the first piezoelectric signature and the second piezoelectric signature are each dependent on a structural state of the piezoelectric container.

21. The system of claim 20, further comprising:

a piezoelectric signature generator that generates the first piezoelectric signature or the second piezoelectric signature of the piezoelectric container.

22. The system of claim 20, further comprising cloud-based storage that stores the first piezoelectric signature in cloud-based storage.

23. The system of claim 20, wherein the first piezoelectric signature and the second piezoelectric signature are each dependent a physical state of contents sealed in the piezoelectric container.

24. The system of claim 20, wherein the first piezoelectric signature and the second piezoelectric signature are each dependent on a physical state of packing material in the piezoelectric container.

25. The system of claim 20, wherein the second piezoelectric signature of the piezoelectric container is generated upon receipt of the piezoelectric container from transit.

26. The system of claim 20, wherein when the comparing identifies that the first piezoelectric signature and the second piezoelectric signature are identical or within a predetermined amount of difference, then it is determined that the piezoelectric container has not been tampered with, and wherein when the first piezoelectric signature and the second piezoelectric signature are identified as not identical or have a difference greater than a predetermined amount, then it is determined that the piezoelectric container has been tampered with.

27. The system of claim 20, wherein the first piezoelectric signature and the second piezoelectric signature are each based on a piezoelectric signature of the piezoelectric container and cyber-information.

28. The system of claim 20, wherein the first piezoelectric signature is signed using a public key infrastructure (PKI) technique.

* * * * *